(12) United States Patent
Chen et al.

(10) Patent No.: US 7,184,206 B2
(45) Date of Patent: Feb. 27, 2007

(54) EVANESCENT-FIELD OPTICAL AMPLIFIERS AND LASERS

(75) Inventors: Nan-Kuang Chen, Taipei Hsien (TW); Sien Chi, Hsin-Chu (TW); Shiao-Min Tseng, Hsin-Chu (TW); Yinchieh Lai, Taichung (TW)

(73) Assignee: National Chiao Tung University, Hsin-Chu (TW)

( * ) Notice: Subject to any disclaimer, the term of this patent is extended or adjusted under 35 U.S.C. 154(b) by 7 days.

(21) Appl. No.: 10/833,437

(22) Filed: Apr. 28, 2004

(65) Prior Publication Data

US 2004/0218257 A1 Nov. 4, 2004

(30) Foreign Application Priority Data

Apr. 29, 2003 (TW) .................. 92110066 A
Apr. 12, 2004 (TW) .................. 93110154 A

(51) Int. Cl.
*H01S 3/00* (2006.01)
(52) U.S. Cl. .................. 359/341.1; 359/341.32
(58) Field of Classification Search ............. 359/341.1, 359/341.32
See application file for complete search history.

(56) References Cited

U.S. PATENT DOCUMENTS

| | | | | |
|---|---|---|---|---|
| 5,809,188 A | * | 9/1998 | Tseng et al. | 385/37 |
| 6,052,220 A | * | 4/2000 | Lawrence et al. | 359/341.1 |
| 6,330,038 B1 | * | 12/2001 | Johnson | 348/625 |
| 6,483,981 B1 | * | 11/2002 | Krahn et al. | 385/140 |
| 6,489,399 B1 | * | 12/2002 | Chan et al. | 525/191 |
| 6,625,349 B2 | * | 9/2003 | Zhao et al. | 385/30 |
| 7,024,072 B2 | * | 4/2006 | Chen et al. | 385/30 |

OTHER PUBLICATIONS

Barclay et al. Experimental Demonstration of Evanescent Coupling from Optical Fibre Tapers to Photonic Crystal Waveguides. Electronic Letters. May 29, 2003. vol. 39. No. 11.*
Panajotov, Krassimir. Evanescent Field Coupling Between Single-Mode Fiber and a Planar Waveguide with Absorption or Gain. J. Opt. Soc. Am. B/vol. 13, No. 11. Nov. 1996.□□.*
Kouznetsov et al. Slab Deliver of Incoherent Pump Light to Double-Clad Fiber Amplifiers: An Analytic Approach. IEEE Journal of Quantum Electronics, vol. 40, No. 4, Apr. 2004.*

* cited by examiner

*Primary Examiner*—Deandra M. Hughes
(74) *Attorney, Agent, or Firm*—Volpe and Koenig, P.C.

(57) ABSTRACT

An optical amplifier and a laser generator based on the fiber side-polished technology having a high pumping efficiency, a low noise figure and a small footprint are provided in this application. The optical amplifier and the laser, which have a very long effective interaction length in conjunction with highly doped Erbium glass attached to its surface and an addition of a slanted fiber grating inscribed in the guiding core at the polished region can spatially separate the signal and pump power to simultaneously improve the pumping efficiency and optimize the penetrated depth of the signal evanescent-field. The spontaneous emission is kept from being amplified and therefore a high quality amplified signal is produced.

22 Claims, 16 Drawing Sheets

EVANESCENT-FIELD OPTICAL AMPLIFIERS AND LASERS

FIELD OF THE INVENTION

The present invention relates to an optical amplifier and a laser, in particular to the optical amplifier and the laser, which have an optical gain medium overlaying the evanescent-field of a side-polished fiber and a grating inscribed in a guiding core in side-polished region.

BACKGROUND OF THE INVENTION

The optical amplifier, which is one of the most important devices for the optical communication system, can regenerate a light signal, which is attenuated while transmitting and dividing. Therefore, the development of an optical amplifier, which has a smaller volume, less noise and lower price will have a great effect on the metropolitan and the access network in the future.

In chief, three kinds of optical amplifiers are widespread in the fiber communication system, i.e. a semiconductor type, a doped fiber type and a nonlinear type. Problems of the inter-signal modulation and the distortion are easily resulted from the channel crosstalk, the four-wave mixing and the sensitivity to the polarization while the semiconductor amplifier is used for the dense wavelength division multiplexing (DWDM) system. Furthermore, a large refractive index difference between the semiconductor material and the transmission fiber leads to significant Fresnel reflection losses.

The Raman amplifier utilizing a nonlinear effect has been extensively commercialized in the recent years. The Raman amplifier has a very broad bandwidth for light amplification. However, an amplifying medium of a long-distance fiber and a high-power pumping laser are required due to the poor nonlinear coefficients of the silica fibers. As a result, the cost is expensive and the efficiency is less than those of the doped fiber amplifier. Hence the Raman amplifier dominates the wavelengths in which the doped fiber amplifier cannot operate.

Nowadays, the doped fiber amplifier is the most important and popular active device used for the DWDM system. The doped fiber, which has a dopant of rare-earth ions in the fiber, provides an optical gain of a broad wavelength range by utilizing an energy difference generating from a transition of the excited electron in the 4f electronic shell of the lanthanons series element and thereby an intensity of the light signal in the range is amplified through these excited electrons.

The erbium-doped fiber amplifier (EDFA) is the most improved one among the various doped fiber amplifiers. The working principle of the so-called EDFA is described as follows: Firstly, a pumping laser provides an appropriate initial optical source to excite the electron in the 4f electronic shell of the erbium ion from a ground state to an excited state. Then, when a light signal passes through, the transition to the ground state of the excited electron will be induced and then a photon having a same C band as the light signal will be emitted. The purpose of amplification is thus achieved.

The signal intensity will decay a lot when the DWDM signal transmits for a long distance or when the DWDM signal is divided. The intensity decaying will make the signal have a poor signal-to-noise ratio (SNR) and seriously influence the transmission quality. In order to relay the light signal in the network, the intensity of the light signal must be amplified by the EDFA after light transmitting or dividing.

Furthermore, the energy of the light signal can be directly amplified by the EDFA and a complicated optic-electro transformation is needless to involve. Such amplification has the advantages of the high amplification factor and the optical gain and the light polarization can be maintained. A simultaneous amplification for different wavelengths is hence achieved. The great development of the EDFA has improved the optical transparency of the physical layer in the optical communication and made the fiber communication break the limitation of the conventional optic-electro-optic transformation so as to enter a new age of the photonic network.

Besides, a fiber laser can be manufactured by applying the operation mechanism of the EDFA. An optical resonance system for exciting the photon is formed by installing a set of fiber gratings at both ends of the erbium doped fiber. The excited energy receives exciting emissions when the pumping light is repeatedly reflected in the fiber and the energy is amplified to generate a laser.

However, efforts to overcome the difficulties relative to the structure of EDFA are still necessary to be done. Since the modified chemical vapor deposition (MCVD) processing of the EDFA is employed, the erbium ion concentration is not easily to be controlled to prevent the up-conversion or the pair-induced quenching resulted from the uneven distribution of erbium ions, which cause a lower quantum efficiency. Therefore, the length of the erbium doped fiber must be long enough (>1 m) to achieve the amplification and thus the volume of the optical amplifier cannot be effectively reduced.

Although the pumping light and the signal light can most compactly and effectively overlap by completely doping the optical gain medium into the guiding core, the amplified spontaneous emission is limited in the guiding core and continuously amplified. This effect leads to a competition for the optical gain between the amplified spontaneous emission and the signal light and a poor SNR of the signal.

Since the application of the optical amplifier is so broad, a great effort has been done for manufacturing the optical amplifier and the laser in the field of fiber device. Several manufacturing methods are revealed and described as follows:

In 1972, a method related to an excitation by the evanescent-field of the optical waveguide for manufacturing the continuously output dye laser was disclosed by E. P. Ippen with the Bell Lab in the United States. Because there was no optical resonating system involved in this method and the refractive index of the dye was not easy to closely control to the effective refractive index of the waveguide, they had just shown that the optical amplification can be achieved based on the pumping through evanescent-field coupling.

The method to fabricate a dye fiber laser, which is related to the evanescent-pumping of a side-polished fiber, was further disclosed by H. J. Shaw et al. with the Stanford University in 1980. In this application, an optical gain of 22 dB would be obtained while using a side-polished fiber merely having an effective interaction length of 1 mm and a pulse laser. However, when the signal light beam and the pumping light beam co-propagate in the fiber, the signal evanescent-field will penetrate more because of the larger wavelength of the signal light beam. For obtaining better excitation efficiency, the pumping energy has to penetrate the optical gain medium to reach a penetrated position, which is the same as that of the signal light beam at least.

Moreover, in order to get a broader excited area of the optical gain medium, the pumping light beam have to penetrate the optical gain medium as much as possible. On the other hand, in order to prevent the signal energy loss resulted from an over-penetration of the signal light, the leaky depth of the signal evanescent-field has to be limited and thus the leaky depth of the pumping light beam is not enough to excite the optical gain medium. Hence a filter is needed to filter the unused pumping power away in front of the receiver and this would result in an additional energy consuming. Therefore, it is difficult to simultaneously obtain a better exciting efficiency and an appropriate penetration of the signal evanescent-field.

Besides, the optical gain amplification was not effectively enhanced due to a poor technique for the fiber polishing and therefore the effective interaction length of the side-polished fiber was not long enough. Moreover, a temperature variation, which occurs while the dye absorbs the pumping energy, also has some influences on the refractive index of the dye. The variation of the refractive index results in a changing leaky depth of the evanescent field of the signal light beam and the excited light beam, and the optical gain obtained from the signal light is changed accordingly. Therefore the stability of the optical power output is seriously influenced.

Another kind of optical amplifier is disclosed by V. A. Kozlov et al. with the Russian Academy of Sciences (1994). The LiF crystal having a silicon dioxide coating, which has a holographic grating thereon, is worked as an optical waveguide, wherein the signal light is coupled to the optical waveguide by the holographic grating. The LiF crystal was transversely pumped by the pumping light beam in a direction from the back of the LiF crystal and hence the signal light beam would obtain the optical gain from the LiF crystal through evanescent-field coupling. However, a high-density overlap among the pumping energy, the signal energy and the optical gain medium cannot be obtained by this kind of excitation method. Thus an optical gain with high quantum efficiency is difficult to achieve. Moreover, the method of the signal incidence, which is perpendicular to the optical waveguide is not practical in the optical communication. Hence the utility of the application still needs to be considered.

A polished substrate which is made of a silicon wafer, is applied to fabricate a side-polished fiber dye optical amplifier having a long interaction length by Tseng et al. with the Tsing-Hua Univerty in Taiwan. In this application, a fiber having an effective interaction length of 5.7 mm and a relative optical gain with 95 times were demonstrated. However, the pumping efficiency is still not significantly improved because the optimal evanescent-field leaky depths of the signal and the pumping light cannot be obtained simultaneously, either.

In order to overcome the foresaid drawbacks in the prior art, an evanescent-field optical amplifier and a laser are provided in the present invention.

SUMMARY OF THE INVENTION

The main purpose of the present invention is to provide an optical amplifier and a laser, which have a high pumping efficiency by utilizing a side-polished fiber cooperating with a highly rare-earth-ion doped optical gain medium and a grating inscribed in a guiding core near the evanescent-field to couple almost entire pumping power toward the optical gain medium.

In accordance with the main purpose of the present invention, an optical amplifier is provided, which includes: at least a fiber having a guiding core and a shell cladding the guiding core, wherein the shell has an evanescent-field area; at least a first grating located at a position of the guiding core, wherein the position corresponds to the evanescent-field area; and an optical gain medium having a dopant of ions and attached to the evanescent-field area.

Preferably, when a first pumping light beam and a signal light beam propagate forward in said guiding core, the first pumping light beam is coupled into the optical gain medium by the first grating and excites the dopant to generate an optical gain to amplify the signal light beam, which is continuously propagating in the guiding core.

Preferably, the evanescent-field area is made by a polishing method.

Preferably, the evanescent-field area is made by a laser-paring method.

Preferably, the optical amplifier further includes a second grating having a period different from that of the first grating, wherein an angle is formed between the first grating and the second grating, thereby a second pumping light beam is coupled into the optical gain medium for amplifying the optical gain.

Preferably, the first grating and the second grating are selected from a group consisting of a Long Period Grating, a Blazed Bragg Grating and a Super Structure Grating.

Preferably, the optical gain medium has a filtering function for gain flattening of the optical gain.

Preferably, the ions are rare-earth ions.

Preferably, the dopant of ions is one of erbium ions and erbium-ytterbium co-doped ions.

Preferably, the optical gain medium has a host made of one selected from a group consisting of a polymer material, a glass material and a crystal material.

Preferably, the optical gain medium having a dopant of erbium ions is further doped with aluminum.

Preferably, the optical gain medium has one property selected from a group consisting of non-linear effect, high birefringence and high dispersive characteristic.

Preferably, the optical gain medium further having a polymer layer cladding thereon.

Preferably, the optical amplifier further includes an optical film sandwiched between the optical gain medium and the polymer layer, wherein the pumping light beam is reflected into the optical gain medium by the optical film.

Preferably, the optical gain medium is one selected from a group consisting of an organic photo-luminescence material, an organic electro-luminescence material, an organic semiconductor, a laser glass, a laser crystal and a liquid crystal.

Preferably, the optical gain medium further has one of a liquid crystal structure and a photonic crystal structure.

Preferably, the photonic crystal structure has a plurality of cavities and a filler filled in the plurality of cavities.

Preferably, the plural cavities are arranged in one of a manner parallel to the guiding core and a manner perpendicular to the guiding core.

Preferably, the filler is an EO (Electro-Optic) polymer.

Preferably, the filler and the photonic crystal structure respectively have an adjustable refractive index.

Preferably, the refractive index of the filler and the photonic crystal is adjusted in response to one selected from a group consisting of an electro-optic effect, a thermo-optic effect, an acousto-optic effect and an optical nonlinear effect.

Preferably, the filler has an adjustable volume.

Preferably, the volume of the filler is adjusted in response to one selected from a group consisting of a thermo-optic effect, a piezo-electric effect and an acousto-optic effect.

Another purpose of the present invention is to provide an optical amplifier and a laser, which have a high pumping efficiency by utilizing a side-polished fiber with an optical gain medium having a dopant of rare-earth ions and a grating inscribed in a guiding core near the evanescent-field to couple almost entire pumping power toward the optical gain medium.

Another purpose of the present invention is to provide a laser, which includes: at least a fiber having a guiding core and a shell cladding the guiding core, wherein the shell has an evanescent-field area; at least a first grating located at a first position of the guiding core, wherein the first position corresponds to the evanescent-field area; a second grating and a third grating located in front of and in rear of the first grating respectively; and an optical gain medium having a rare-earth ion and attached to the evanescent-field area.

Another purpose of the present invention is to provide a laser, which includes: at least a fiber having a guiding core and a shell cladding the guiding core, wherein the shell has an evanescent-field area; at least a first grating located at a first position of the guiding core, wherein the first position corresponds to the evanescent-field area; a second grating and a third grating located in front of and in rear of the first grating respectively; and an optical gain medium having a dopant of rare-earth ions and attached to the evanescent-field area.

In accordance with the present invention, when a first pumping light beam passes through the second grating, the first pumping light beam is coupled into the optical gain medium by the first grating to excite the dopant of rare-earth ions for generating an optical gain; a resonated light beam is generated and repeatedly reflected between the second grating and the third grating and an energy of the resonated light beam is repeatedly amplified thereof; and when the resonated light beam propagates to the third grating, a specific ratio of the optical gain is able to pass through the third grating to generate a laser.

Preferably, the laser generator further includes a fourth grating having a period different from that of the first grating, wherein an angle is formed between the fourth grating and the first grating, thereby a second pumping light beam is coupled into the optical gain medium for amplifying the optical gain.

Preferably, the first grating and the fourth grating are ones selected from a group consisting of a Long Period Grating, a Blazed Bragg Grating and a Super Structure Grating.

Preferably, the second grating is one of a Fiber Bragg Grating and a Chirped Grating.

Preferably, the third grating is one of a Fiber Bragg Grating and a Chirped Grating.

Preferably, the second grating and the third grating are located at a second position of the guiding core.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
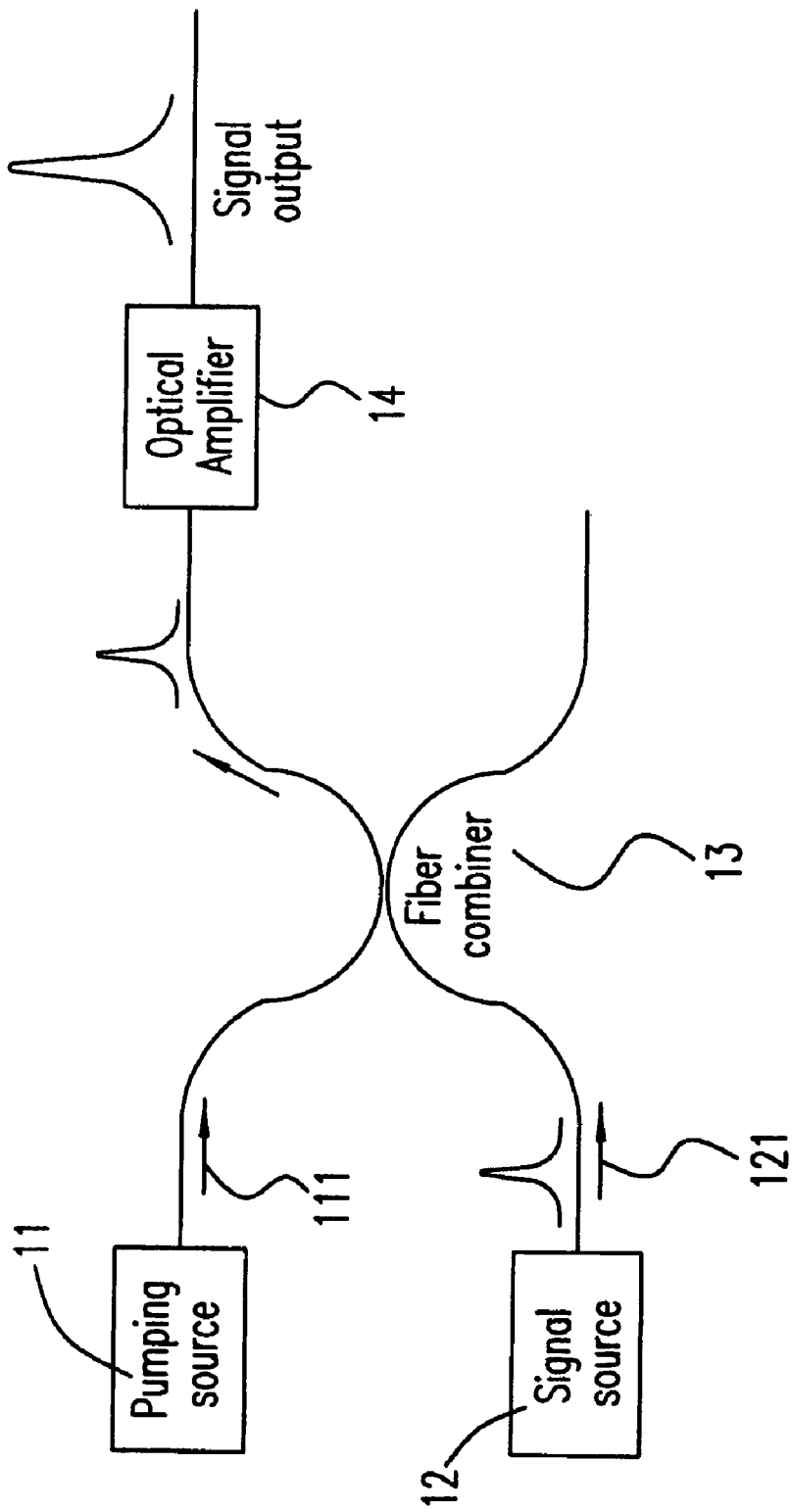
FIG. 1 is a diagram illustrating the principle of the optical gain according to a preferred embodiment of the present invention.

Please refer to FIG. 1, which illustrates the principle of the optical amplifier according to the present invention. The pumping light beam 111 from the pumping source 11 and the signal light beam 121 from the signal source are collected by the fiber combiner 13 and then propagate in a fiber (not shown). By an optical gain of the optical amplifier 14, which is related to the present application, a signal output having a higher intensity and a specific wavelength can be generated and continuously propagate in the fiber.

Figure 2:
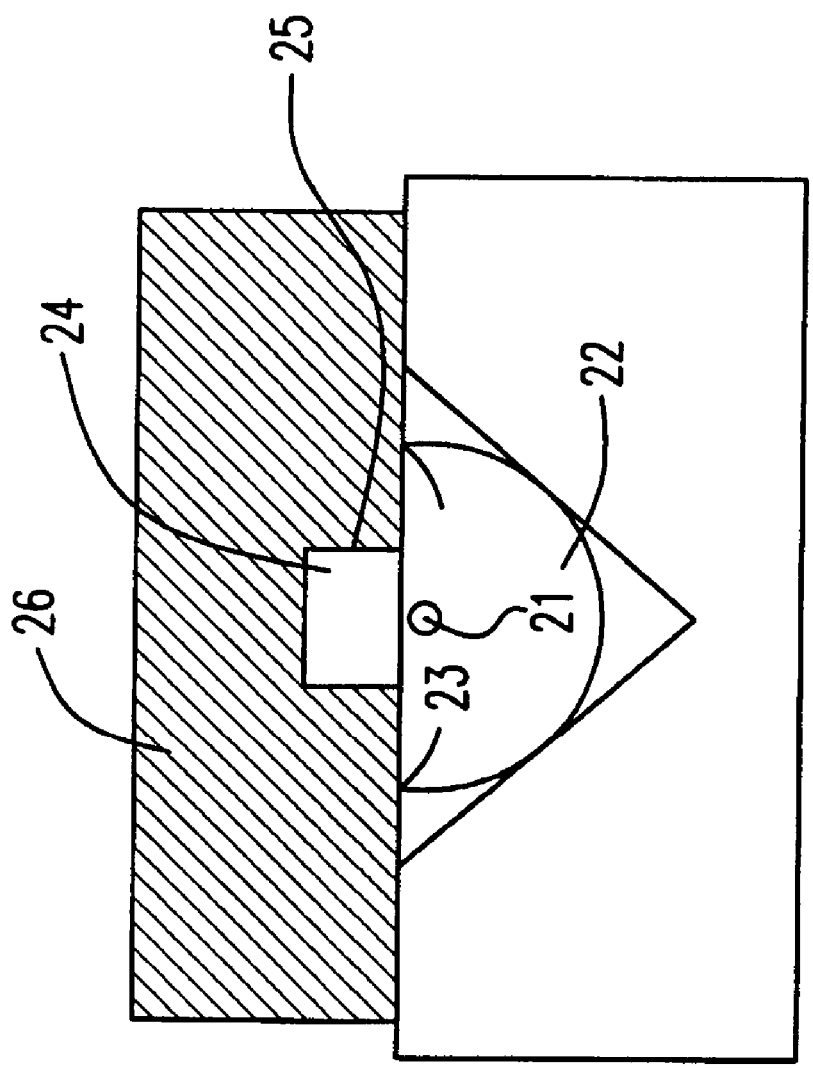
FIG. 2 is a diagram illustrating the structure of the optical amplifier according to a preferred embodiment of the present invention.
Figure 3A:
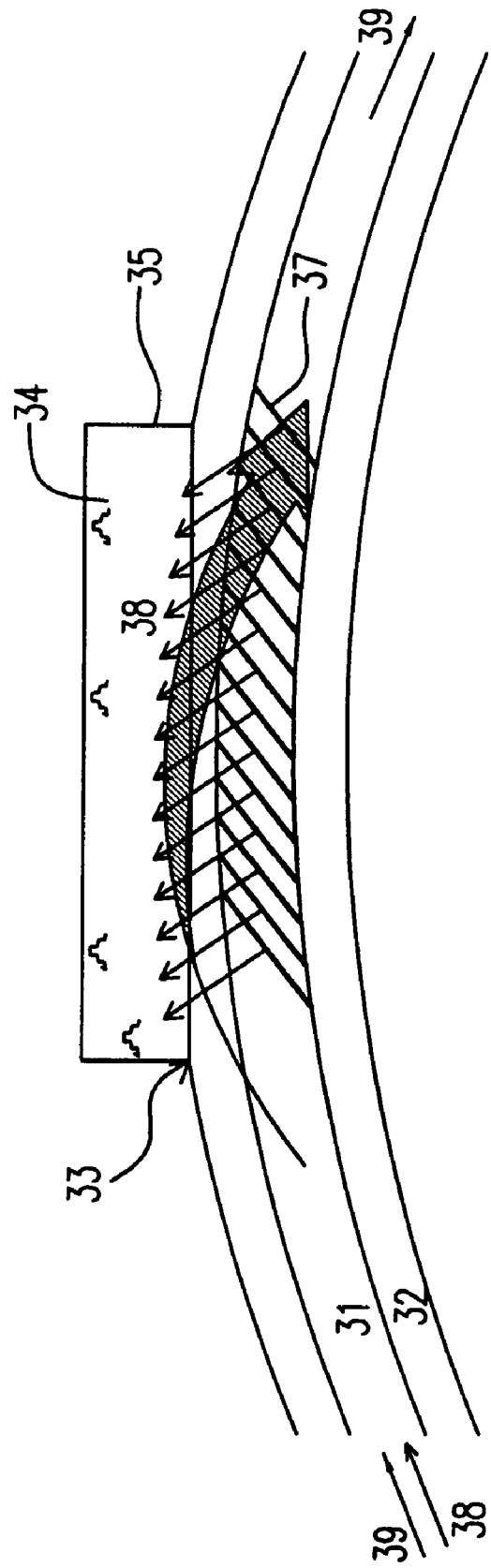
FIG. 3(a) is a diagram illustrating the operation of the optical amplifier according to a preferred embodiment of the present invention.
Figure 3B:
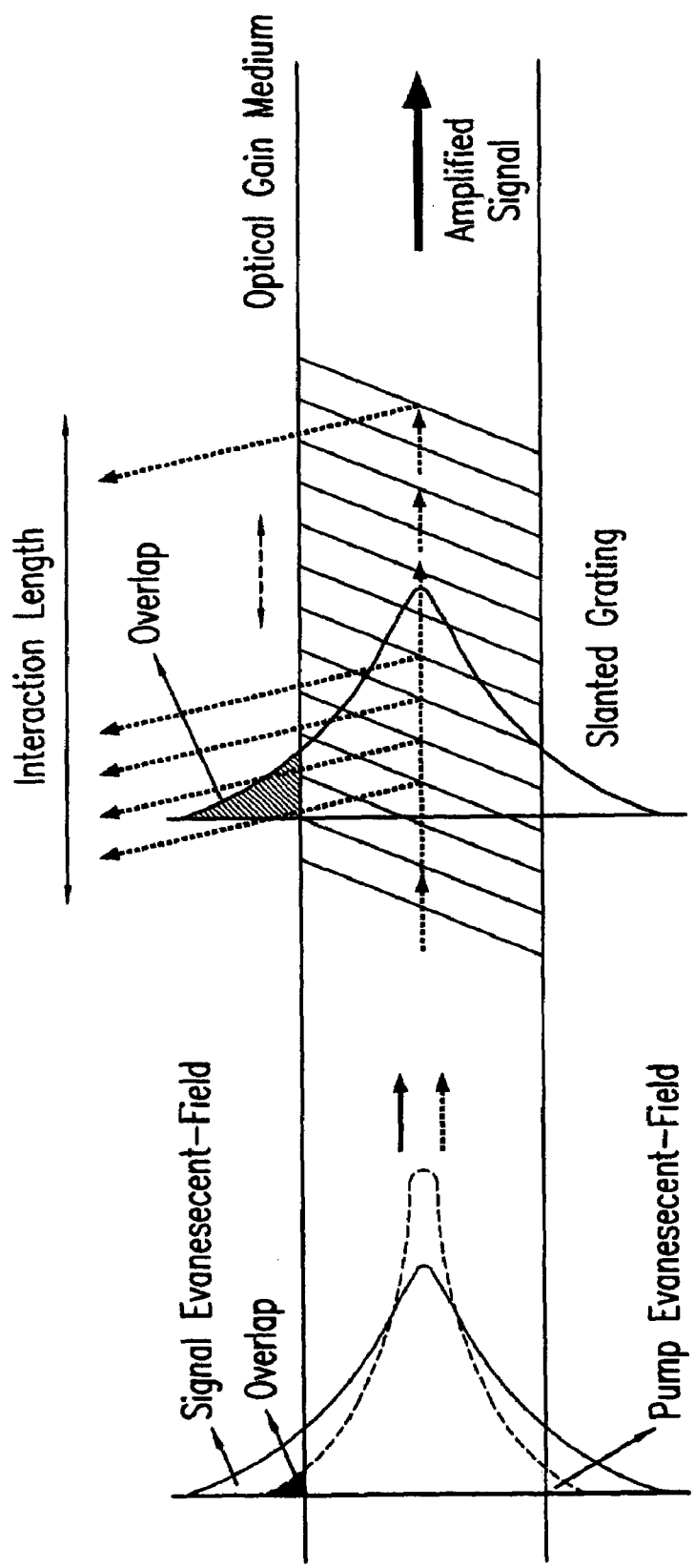
FIG. 3(b) is a diagram showing the filtering effect of the slanted grating according to a preferred embodiment of the present invention.
Figure 3C:
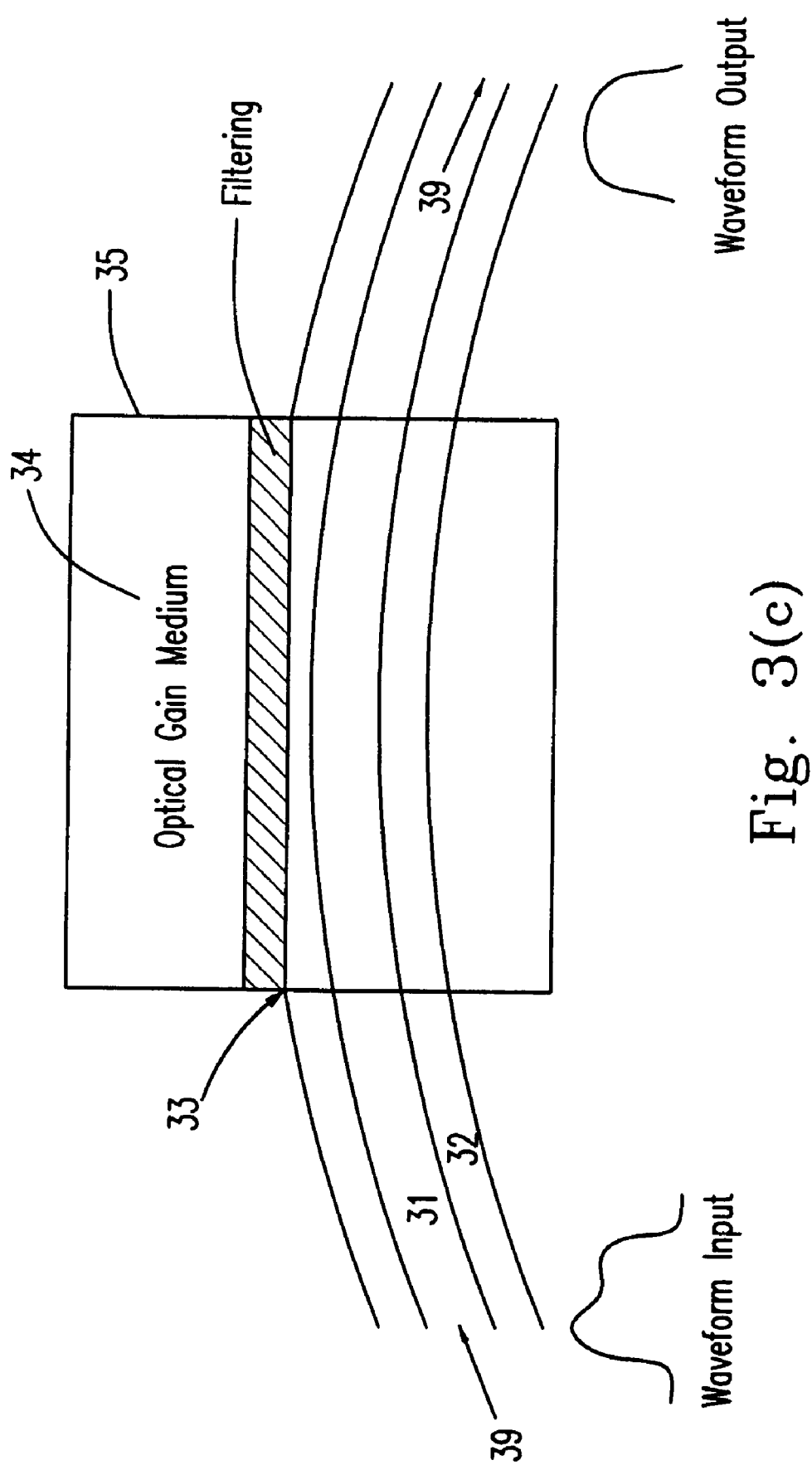
FIG. 3(c) is a diagram illustrating the filtering of the slanted grating according to a preferred embodiment of the present invention.
Figure 3D:
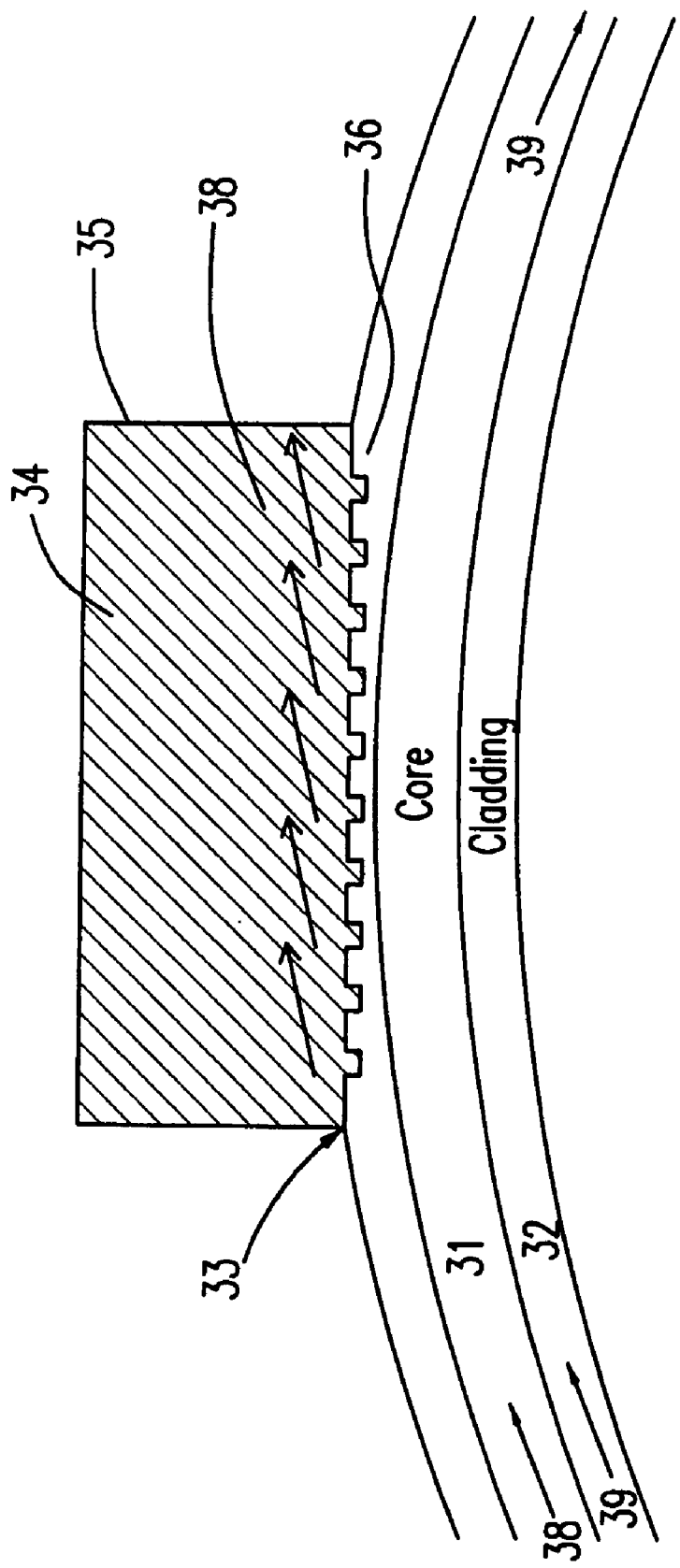
FIG. 3(d) is a diagram illustrating the operation of the optical amplifier according to a second preferred embodiment of the present invention, wherein a long period grating is used for coupling the pumping light beam into the optical gain medium.
Figure 4A:
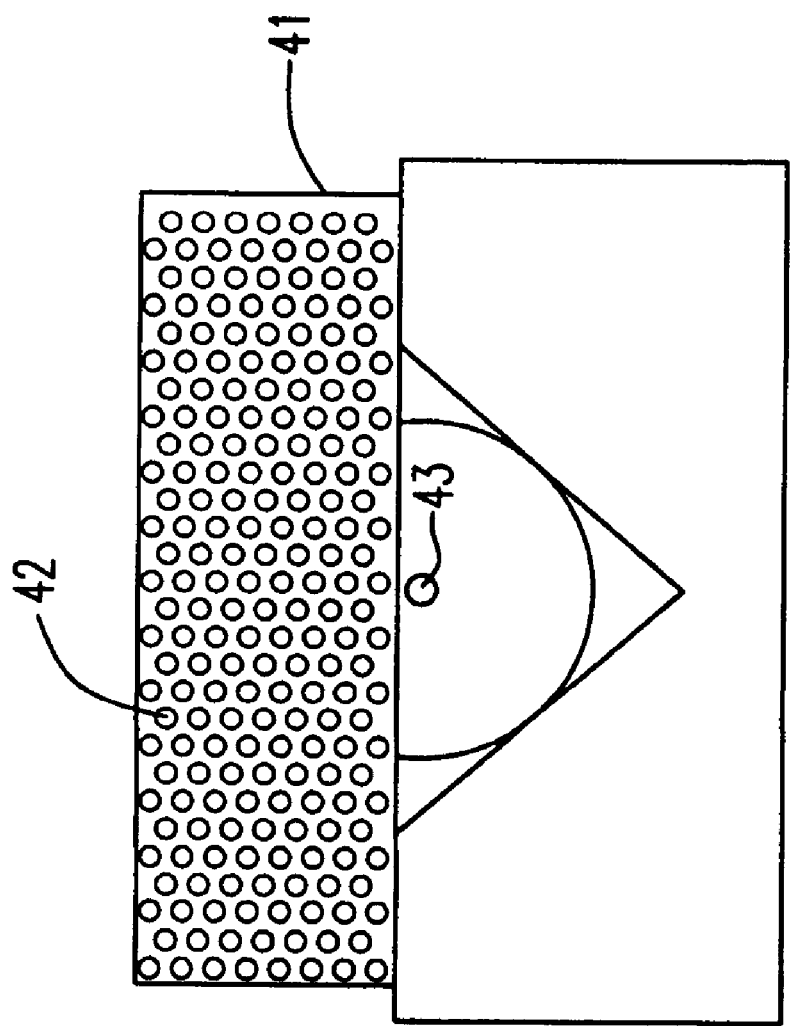
FIG. 4(a) is a diagram illustrating the structure of the optical amplifier according to a third preferred embodiment of the present invention, wherein the photonic crystal is served as the optical gain medium and the plurality of cavities are arranged parallel to the guiding core.
Figure 4B:
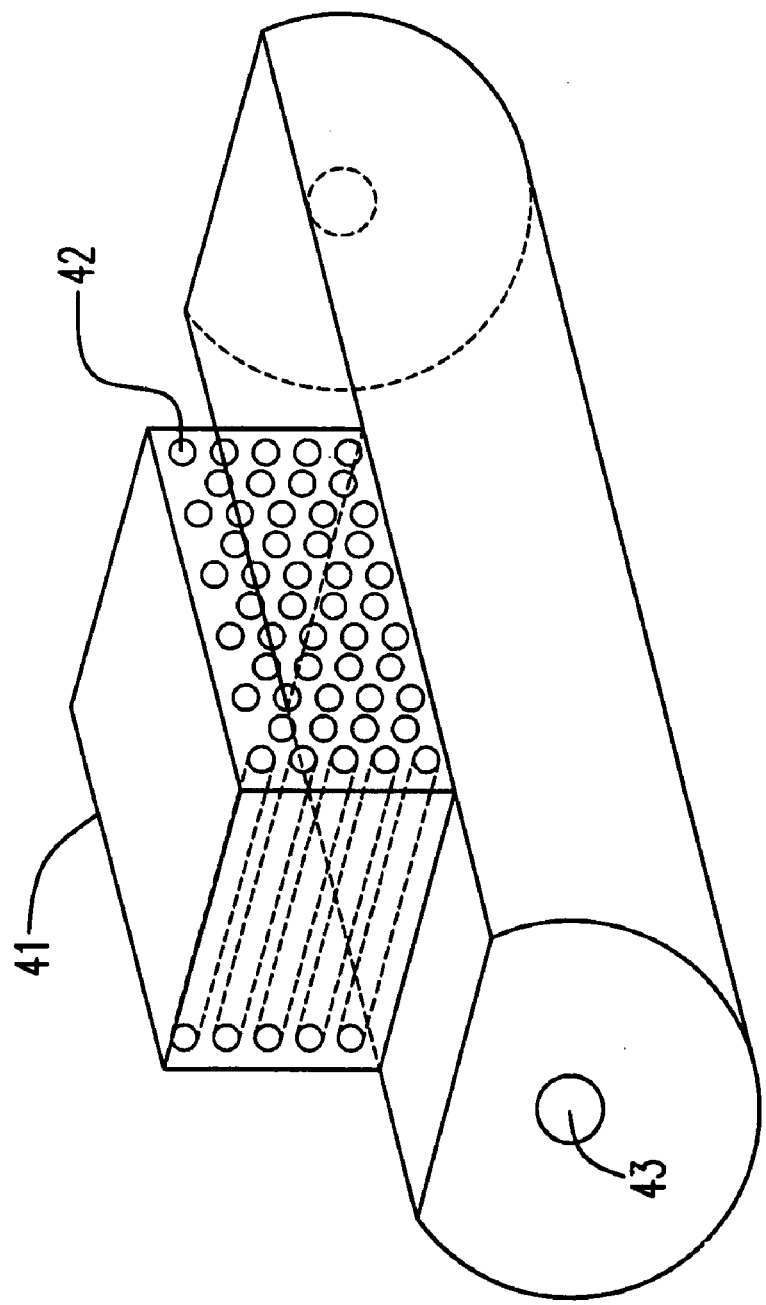
FIG. 4(b) is a diagram illustrating the structure of the optical amplifier according to a fourth preferred embodiment of the present invention, wherein the photonic crystal is served as the optical gain medium and the plurality of cavities are arranged perpendicular to the guiding core.
Figure 4C:
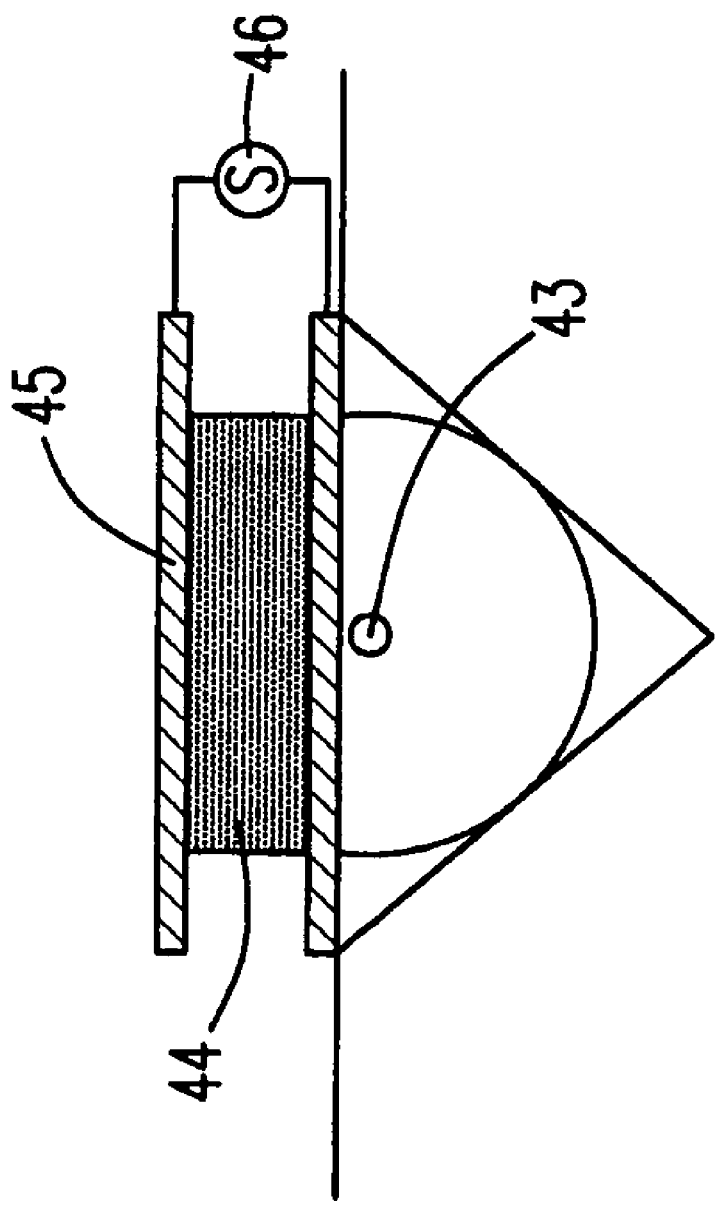
FIG. 4(c) is a diagram illustrating the structure of the optical amplifier according to a fifth preferred embodiment of the present invention, wherein the electro-luminescence material is served as the optical gain medium.
Figure 4D:
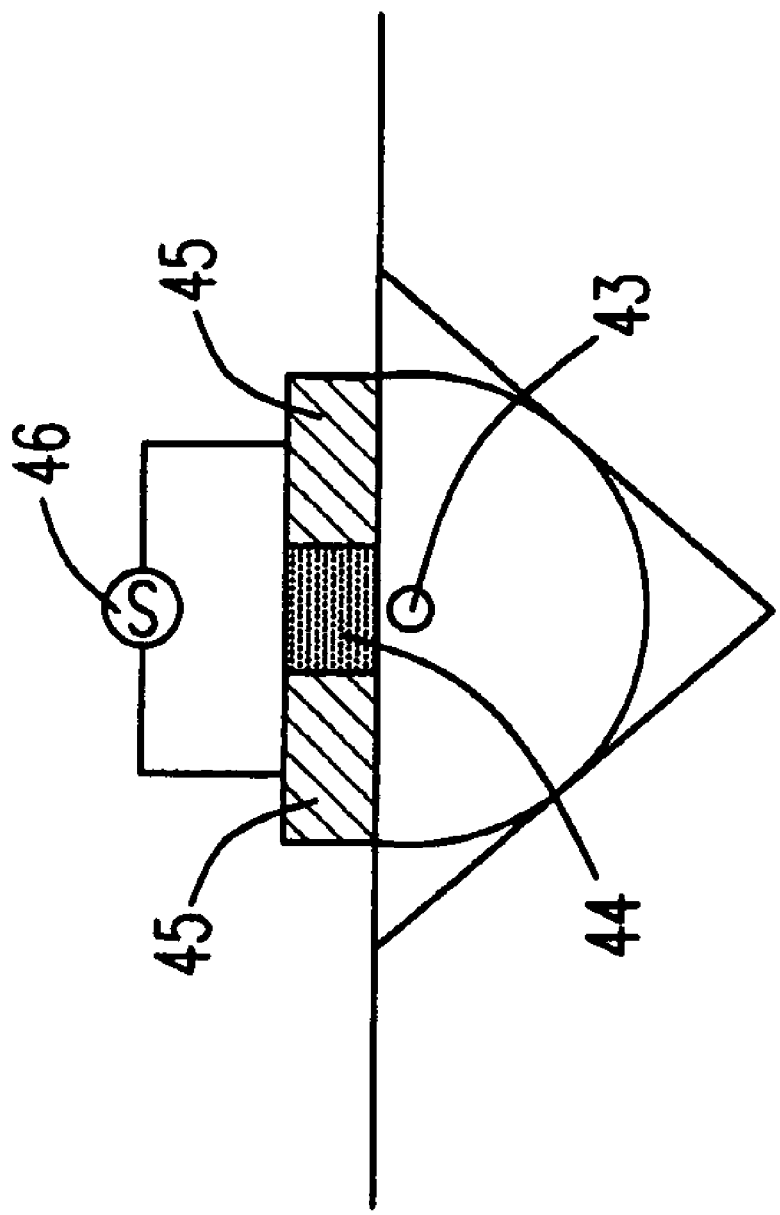
FIG. 4(d) is a diagram illustrating the structure of the optical amplifier according to a sixth preferred embodiment of the present invention, wherein the electro-luminescence material works as the optical gain medium.
Figure 4E:
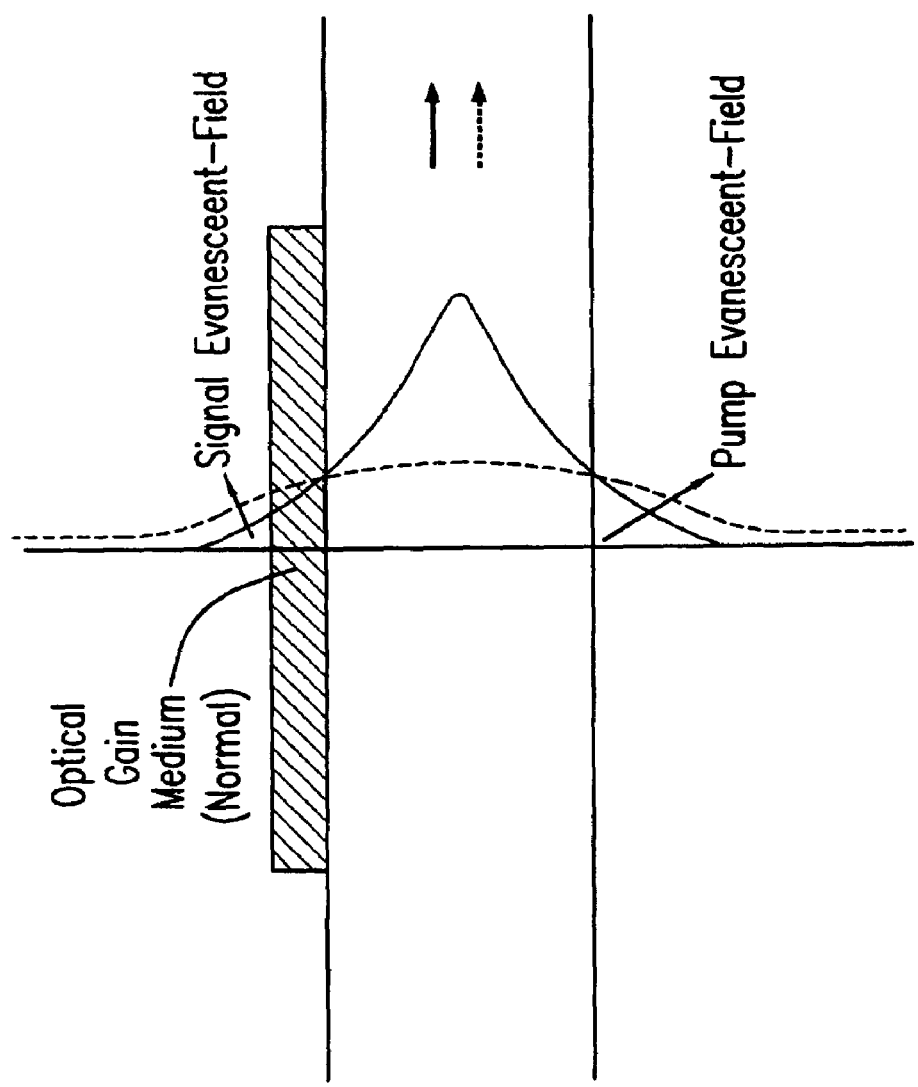
FIG. 4(e) is a diagram showing the optical mode distribution of the optical gain medium which has a normal dispersion factor.
Figure 4F:
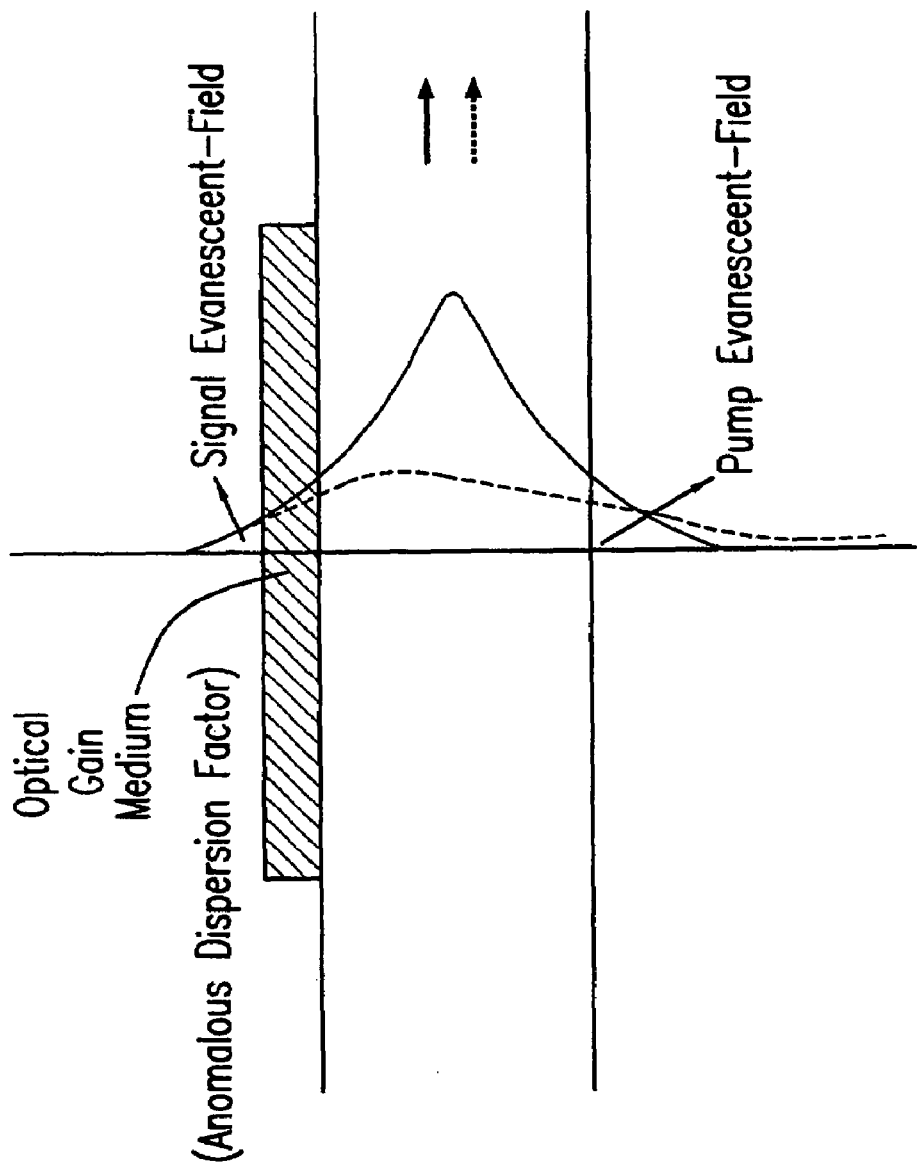
FIG. 4(f) is a diagram showing the optical mode distribution of the photonic crystal which has an anomalous dispersion factor.

Please refer to FIG. 2, which illustrates the structure of the optical amplifier according to a preferred embodiment of the present invention. The optical amplifier includes a fiber, which has the guiding core 21 and the shell 22, the evanescent-field area 23, the optical gain medium 24, the optical film 25, the packaged layer 26 and a grating (not shown) in the guiding core 21. The grating is at a position, which corresponds to the evanescent-field area 23. The shell 22 is cladding the guiding core 21 and has the evanescent-field area 23. The shell 22 is manufactured by the laser paring or the fiber polishing for being penetrated and having the evanescent-field area 23 with an effective interaction length of about 20 mm. Besides, the optical gain medium 24 has a host, which is made of a polymer material, a glass material or a crystal material having the same or a smaller refractive index than the effective refractive index of the evanescent-field area 23. The optical gain medium 24 having dopants of aluminum ions and rare-earth ions in the host, such as an erbium ion or an erbium-ytterbium co-doped ion, is attached to the evanescent-field 23 and then coated by the optical film 25. The packaged material 26 made of a polymer material, which has the same or a lager refractive index than that of the optical gain medium, is used to package outside the optical gain medium 24 and the optical film 25.

It is noted that the optical amplifier can still operate even the refractive index of the optical gain medium 24 is the same with or larger than that of the evanescent-field area 23. The light with a specific wavelength meeting the resonance condition is able to be reflected to the guiding core 21 and continuously propagate therein as long as the thickness of the optical gain medium 24 is reduced to several tens of micrometers, which forms a smooth and flat film.

Please refer to FIG. 3(*a*), which illustrates the operation of the optical amplifier according to a preferred embodiment of the present application. When the pumping light beam 38 and the signal light beam 39 propagate forward in the guiding core 31, the pumping light beam 38 is reflected by the Blazed Bragg Grating 37 (or a Long Period Grating, or a Super Structure Grating) to penetrate the evanescent-field area 33 and then coupled into the optical gain medium 34. The rare-earth ion in the optical gain medium 34 is thus excited and the electron transition is induced to generate an optical gain. The optical gain is able to amplify the intensity of the signal light beam, which continuously propagates in the guiding core.

Besides, the pumping light beam 38 can be repeatedly reflected to the optical gain medium 34 by the optical film 35 to make the electron transition and the photon generation repeatedly happen. Therefore, the function of the signal light beam amplifying can be sustained.

Additionally, a slanted grating is preferred when a grating is sited in the guiding core 21. The overlapping among the pumping light beam 38, the signal light beam 39 and the optical gain medium 34 will be increased by utilizing a slanted grating. Hence the amplifying efficiency is much higher, as shown in FIG. 3(*b*).

The optical properties required for the optical gain medium includes not only a nonlinear effect and a high birefringence, but also a filtering function for gain flattening of the optical gain, as shown in FIG. 3(*c*). Therefore, a photonic crystal structure can be used to replace the optical gain medium. Please refer to FIG. 4(*a*), which illustrates the structure according to another embodiment of the present application. In this embodiment, a photonic crystal structure is used as the optical gain medium. The photonic crystal structure 41 has plural cavities 42 filled with an electro-optical (EO) polymer (not shown), which has a refractive index adjustable in response to an electro-optical effect.

The plural cavities 42 can be arranged in a manner parallel to the guiding core 43, as shown in FIG. 4(*a*), or arranged in a manner perpendicular to the guiding core 43, as shown in FIG. 4(*b*). A photonic band-gap, which blocks the light beam, can be produced in the photonic crystal structure 41 by both of the arranging manners. The wavelength range of the photonic band-gap can be controlled by a refractive index adjustment or a volume adjustment. The refractive index of the filler or that of the photonic crystal structure 41 can be adjusted in response to one of an optical nonlinear effect, an electro-optic effect, a thermo-optic effect and an acousto-optic effect. And the volume of the filler can be adjusted in response to one of a thermo-optic effect, a piezo-electric effect and an acousto-optic effect. Thus the energy of the light having a specific wavelength can be filtered to redistribute the energy of the optical gain.

Particularly, locating the Long Period Grating at a position in the evanescent-field area is preferred than in the guiding core when a Long Period Grating is used to couple the pumping light beam into the optical gain medium, as shown in FIG. 3(*d*). The Long Period Grating 36 is sited in the evanescent-field area 33, so the pumping light beam 38 is coupled forward into the optical gain medium 33. Hence a better amplifying efficiency of the optical gain is achieved.

The optical gain medium could be an organic photoluminescence material, an organic electro-luminescence material an organic semiconductor, a laser glass and a liquid crystal. In particular, when the optical gain medium is made of the organic electro-luminescence material, referring to FIG. 4(*c*) and (*d*), which illustrates the relative position and the structure of the electro-luminescence material 44 and the electrode 45, the thickness of the electro-luminescence material 44 can be adjusted by the electric power or the thermal power. When the electric power, which includes a direct current (D.C.) power and an alternating current (A.C.) power, is applied for the thickness adjusting, the thickness of the electro-luminescence material 44 will be changed. With the thickness changing of the electro-luminescence material 44, the optical gain is altered, too. That means the optical gain is adjustable in this application.

Additionally, the photonic crystal structure 41 can also have a normal or an anomalous dispersion factor. Please refer to FIGS. 4(*e*) and (*f*), which show the optical mode distribution of the pumping light and the signal light in the optical gain medium. The optical mode distributions are affected by a normal and an anomalous dispersion factor, respectively. The photonic crystal 41 having an anomalous dispersion factor can make the signal light have an equalized overlap with the pumping light beam and the photonic crystal structure, even the signal light has different wavelengths.

Figure 5:
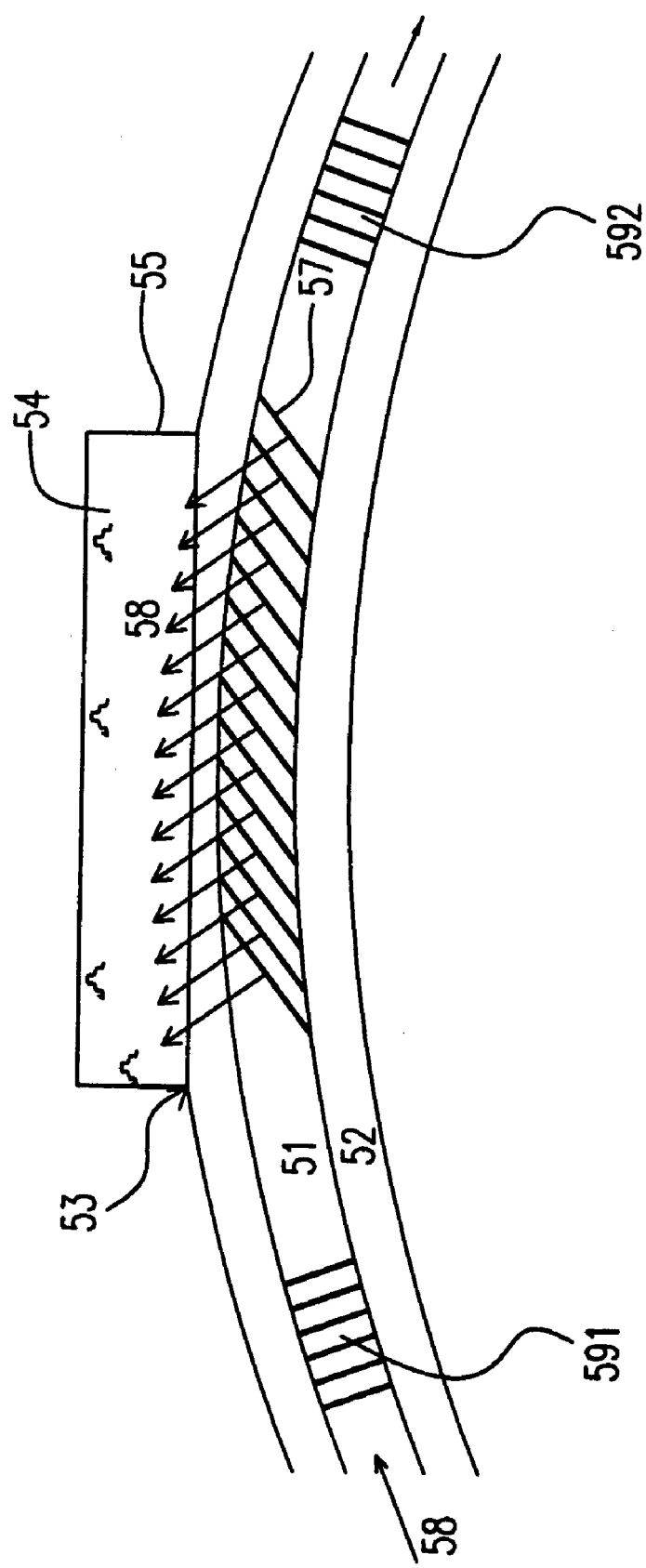
FIG. 5 is a diagram illustrating the operation of the laser generator according to a preferred embodiment of the present invention.

Furthermore, the principle involved in the optical amplifier is also implemented in a fiber laser generator. Please refer to FIG. 5, which illustrates the operation of the laser generator according to a preferred embodiment of the present application. Compared with the optical amplifier, the difference of the laser generator is that a set of gratings, i.e. 591 and 592, which could be a Fiber Bragg Grating or a Chirped Grating, are respectively sited in front of and in rear of the Blazed Bragg Grating 57 in the guiding core 51. Besides, the feeding of the signal light is nonessential when the laser generator operates.

After passing through the Fiber Bragg Grating 591, the pumping light beam 58 propagating in the guiding core 51 is reflected to the optical gain medium 54 (or to a photonic crystal structure) by the Blazed Bragg Grating 57 so as to excite a dopant of rare-earth ions, such as erbium ions. Then the electron transition is induced to generate an optical gain. The optical gain is limited in the region between the two Fiber Bragg Gratings 591 and 592, and a resonated light beam with a specific wavelength is generated and repeatedly reflected back and forth therein. Then the optical gain can repeatedly penetrate the evanescent-field area and enter the optical gain medium 54 in order to obtain more energy to be amplified. When the resonated light beam with a specific wavelength propagates to the Fiber Bragg Grating 592, a specific ratio of the optical gain will pass through the Fiber Bragg Grating 592 so as to generate the wanted laser, wherein the specific ratio depends on the design of the Fiber Bragg Grating.

Another difference of the operating principle between the laser generator and the optical amplifier is that the filtering function of the optical gain medium 54 is nonessential when an optical resonating system including the Fiber Bragg Gratings at both ends of the laser generator is used to select the energy of the specific wavelength. However, an optical gain medium 54 having the filtering function is still required when a Fiber Bragg Grating with a Chirped Grating or two Chirped Gratings are applied. Moreover, according to the technique of the present application, when the photonic crystal is applied for the optical gain medium 54 for its filtering function, a wavelength-adjustable laser generator can be manufactured accordingly.

Figure 6:
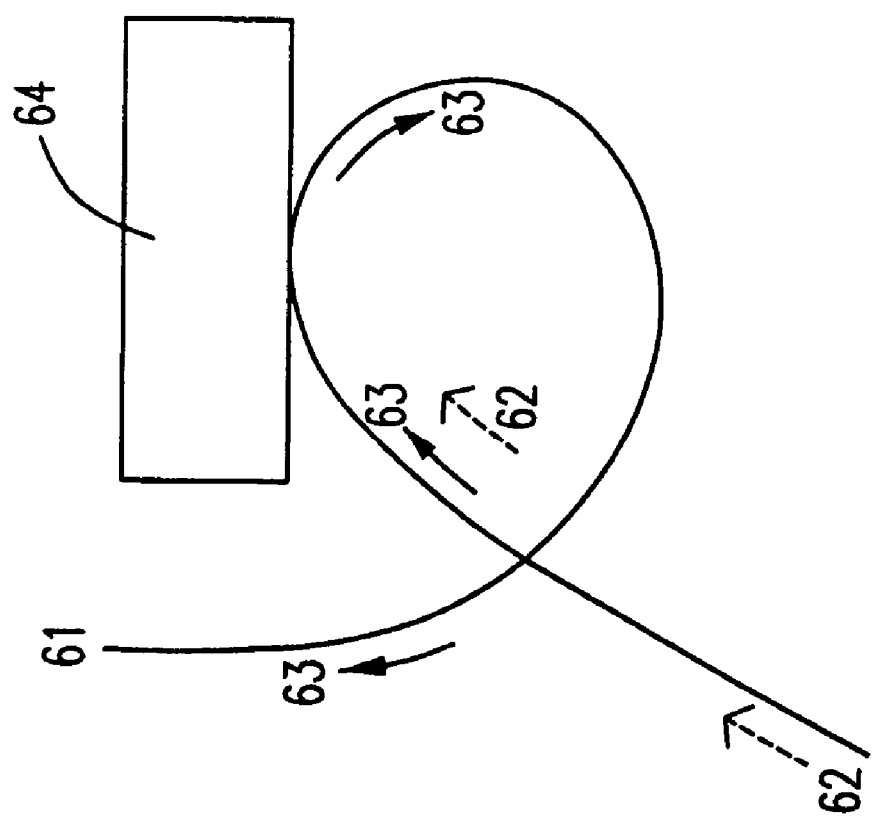
FIG. 6 is a diagram illustrating the structure of the optical resonant system using a ring structure fiber coupler.

Please refer to FIG. 6, a ring structure fiber coupler is also provided in the present application. When the fiber 61 is formed into a ring resonating system, the pumping light beam 62 and the signal light beam 63 can generate a laser in the optical amplifier 64.

Figure 7:
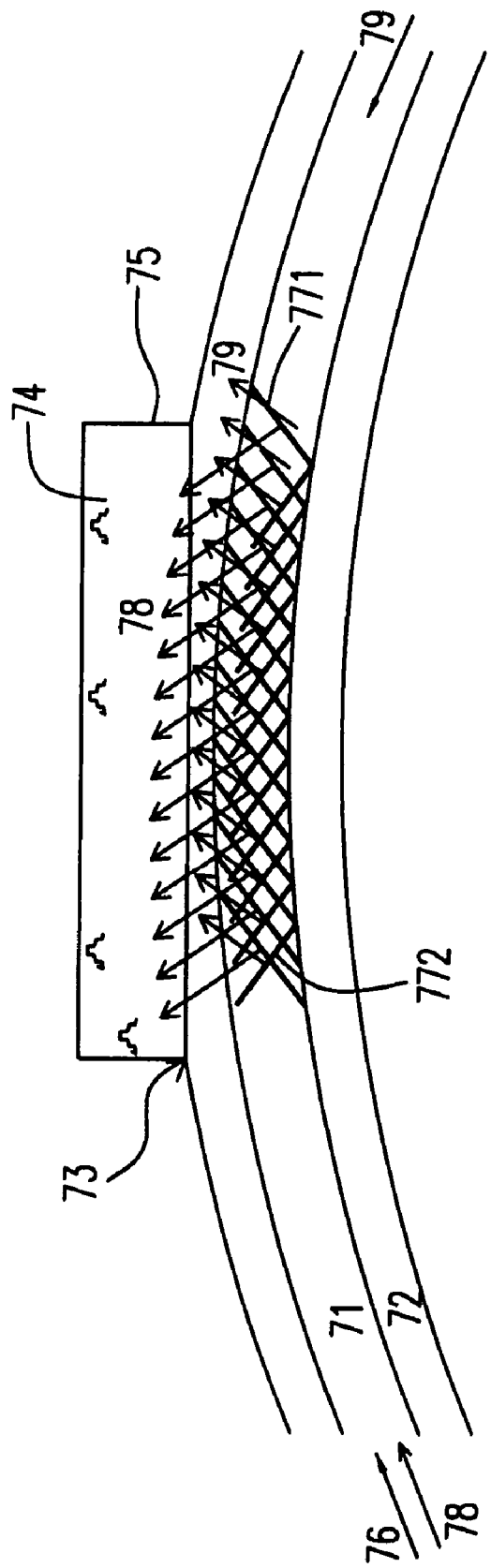
FIG. 7 is a diagram illustrating the structure of the optical amplifier based on a bi-directional pumping scheme.

Additionally, the number of the slanted grating is not limited by the embodiment described in the present invention. Please refer to FIG. 7, which illustrates the structure of the optical amplifier based on a bi-directional pumping scheme. The pumping light beam in each one of both directions, i.e. 78 or 79, is coupled into the optical gain medium 74 by slanted gratings 771 and 772, respectively. There is an angle formed between the two slanted gratings (771 and 772), as shown in FIG. 7. It is noted here the periods of the two gratings must be different. A doubled enhancement of the optical gain can be obtained in this embodiment.

The principle of the bi-directional pumping is also implemented in the laser generator in order to enhance the energy of the generated laser. The only difference between the laser generator and the optical amplifier is that an optical resonating system having the gratings at the both ends of the guiding core 71 is needed in the laser generator.

Figure 8:
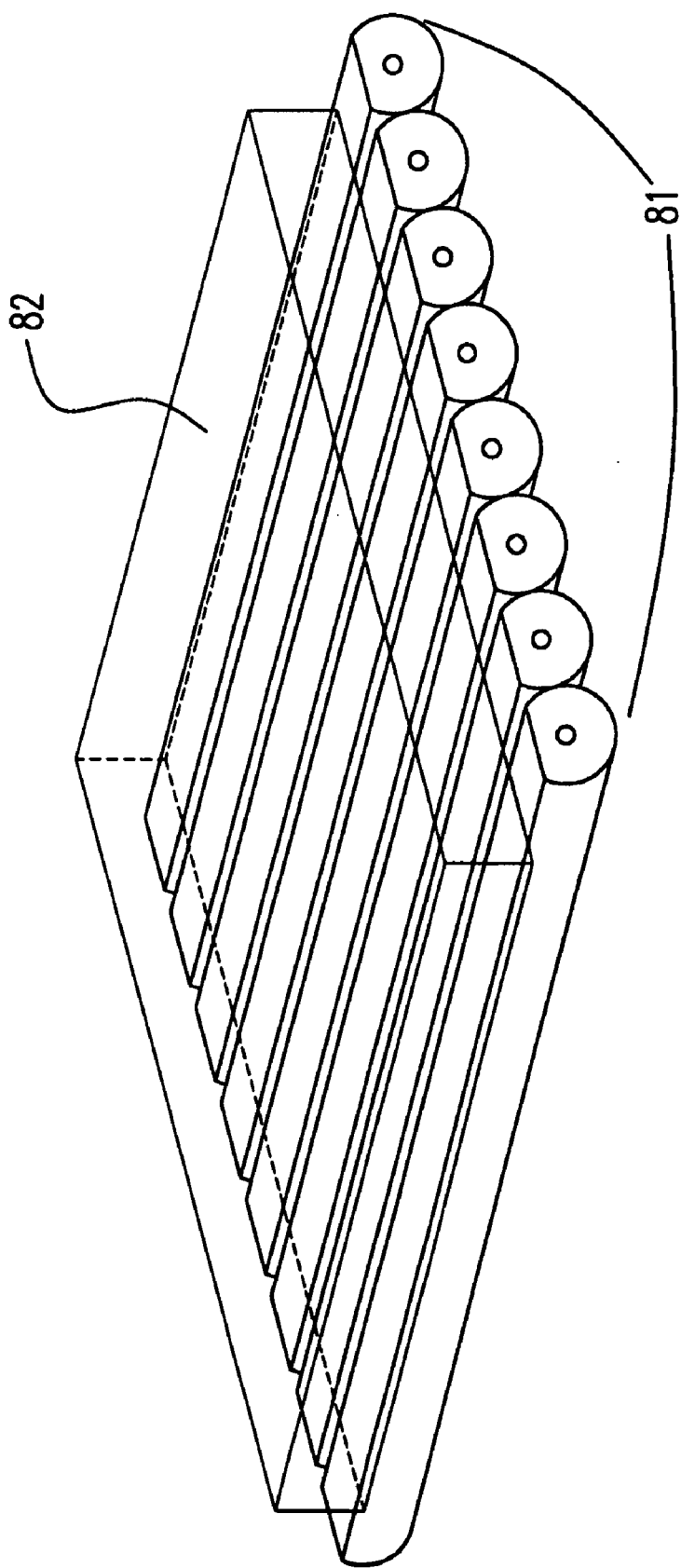
FIG. 8 is a diagram illustrating the structure of a fiber-array optical amplifier and an array laser generator according to a seventh embodiment of the present invention.

The number of the fibers is not limited by the embodiment described in the present invention. Please refer to FIG. 8, the fiber array 81 including more than one fiber is attached to the optical gain medium 82, which is applied for fabricating relevant fiber devices.

According to the above, the optical amplifier and the laser generator, which utilize a side-polished fiber cooperating with an ion doped optical gain medium and a grating sited inside a guiding core near the evanescent-field to reflect a pumping laser to the optical gain medium, are provided in the present application. First, the side-polished fiber cooperating with the ion doped optical gain medium has a quite long interaction length (more than 20 mm). The volume of the optical amplifier is thus smaller than that of the conventional EDFA. This makes the optical amplifier operated by the means of the evanescent-field exciting become more practicable.

Secondly, the exciting efficiency of the optical gain medium can be greatly enhanced through installing the fiber grating in the evanescent-field area of the guiding core, which is able to reflect the pumping light beam to the optical gain medium. Therefore, the loss resulted from an over-exposure of the signal evanescent-field will be prevented and the pumping light beam can be totally coupled into the optical gain medium to obtain the best pumping efficiency.

Hence, the present invention not only has a novelty and a progressive nature, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical amplifier, comprising:
    at least a fiber having a guiding core and a shell cladding said guiding core, wherein said shell has an evanescent-field area;
    at least a blazed grating located at a position of said guiding core, wherein said position corresponds to said evanescent-field area; and
    an optical gain medium having a dopant of ions and attached to said evanescent-field area,
    wherein when a pumping light beam and a signal light beam propagate forward in said guiding core, said pumping light beam is coupled into said optical gain medium by said blazed grating and excites said dopant to generate an optical gain to amplify said signal light beam, which is continuously propagating in said guiding core.

2. The optical amplifier according to claim 1, wherein said evanescent-field area is made by one of a polishing method and a laser-paring method.

3. The optical amplifier according to claim 1 further comprising a second grating having a period different from that of said first grating, wherein an angle is formed between said first grating and said second grating, thereby a second pumping light beam being coupled into said optical gain medium for amplifying said optical gain.

4. The optical amplifier according to claim 3, wherein said first grating and said second grating are selected from a group consisting of a Long Period Grating, a Blazed Bragg Grating and a Super Structure Grating.

5. The optical amplifier according to claim 1, wherein said optical gain medium has a filtering function for gain flattening of said optical gain.

6. The optical amplifier according to claim 1, wherein said dopant of ions is one of erbium ions and erbium-ytterbium co-doped ions.

7. The optical amplifier according to claim 1, wherein said optical gain medium has a host made of one selected from a group consisting of a polymer material, a glass material and a crystal material.

8. The optical amplifier according to claim 6, wherein said optical gain medium having a dopant of erbium ions is further doped with aluminum.

9. The optical amplifier according to claim 1, wherein said optical gain medium has one property selected from a group consisting of non-linear effect, high birefringence and high dispersive characteristic.

10. The optical amplifier according to claim 1, wherein said optical gain medium further comprising a polymer layer cladding thereon.

11. The optical amplifier according to claim 10 further comprising an optical film sandwiched between said optical gain medium and said polymer layer, wherein said pumping light beam is reflected into said optical gain medium by said optical film.

12. The optical amplifier according to claim 1, wherein said optical gain medium is one selected from a group consisting of an organic photo-luminescence material, an organic electro-luminescence material, an organic semiconductor, a laser glass and a laser crystal.

13. The optical amplifier according to claim 1, wherein said optical gain medium further comprises one of a liquid crystal structure and a photonic crystal structure.

14. The optical amplifier according to claim 13, wherein said photonic crystal structure has a plurality of cavities and a filler filled in said plurality of cavities.

15. The optical amplifier according to claim 14, wherein said plurality of cavities are arranged in one of a manner parallel to said guiding core and a manner perpendicular to said guiding core.

16. The optical amplifier according to claim 14, wherein said filler is an EO (Electro-Optic) polymer.

17. The optical amplifier according to claim 14, wherein said filler and said photonic crystal structure respectively have an adjustable refractive index.

18. The optical amplifier according to claim 17, wherein said refractive index of said filler and said photonic crystal structure is adjusted in response to one selected from a group consisting of an electro-optic effect, a thermo-optic effect, an acousto-optic effect and an optical nonlinear effect.

19. The optical amplifier according to claim 14, wherein said filler has an adjustable volume.

20. The optical amplifier according to claim 19, wherein said volume is adjusted in response to one selected from a group consisting of a thermo-optic effect, a piezo-electric effect and an acousto-optic effect.

21. An optical amplifier, comprising:
at least a fiber having a guiding core and a shell cladding said guiding core, wherein said shell has an evanescent-field area;
at least a blazed grating located at a position of said guiding core, wherein said position corresponds to said evanescent-field area; and
an optical gain medium having a dopant of rare-earth ions and attached to said evanescent-field area,
wherein when a pumping light beam and a signal light beam propagate forward in said guiding core, said pumping light beam is coupled into said optical gain medium by said blazed grating and excites said dopant to generate an optical gain to amplify said signal light beam, which is continuously propagating in said guiding core.

22. The optical amplifier according to claim 21, wherein said dopant is one of doping by a single type of rare-earth ions and co-doping by two types of rare-earth ions.

* * * * *